United States Patent
Maki et al.

(10) Patent No.: US 6,193,385 B1
(45) Date of Patent: Feb. 27, 2001

(54) REMOVABLE, REUSABLE SAFETY LIGHT

(75) Inventors: William M. Maki, Skokie; Scott A. Kwit, Hinsdale, both of IL (US)

(73) Assignee: Maklite, L.L.C., Chicago, IL (US)

( * ) Notice: Subject to any disclaimer, the term of this patent is extended or adjusted under 35 U.S.C. 154(b) by 0 days.

(21) Appl. No.: 09/265,681

(22) Filed: Mar. 10, 1999

Related U.S. Application Data

(60) Provisional application No. 60/077,742, filed on Mar. 12, 1998, and provisional application No. 06/094,483, filed on Jul. 28, 1998.

(51) Int. Cl.[7] .................................................. F21V 21/108
(52) U.S. Cl. ............................................. 362/108; 362/103
(58) Field of Search .................................... 362/103, 104, 362/105, 106, 108, 240, 255, 234, 219, 806, 800, 320, 278, 109, 186, 184, 185, 252; 2/247

(56) References Cited

U.S. PATENT DOCUMENTS

| | | | |
|---|---|---|---|
| 4,924,362 | * 5/1990 | Janko | 362/108 |
| 5,128,843 | * 7/1992 | Guritz | 362/103 |
| 5,651,636 | * 7/1997 | Yeh | 404/9 |
| 5,879,076 | * 3/1999 | Cross | 362/555 |
| 5,934,792 | * 8/1999 | Camarota | 362/249 |

* cited by examiner

Primary Examiner—Sandra O'Shea
Assistant Examiner—Hargobind S. Sawhney
(74) Attorney, Agent, or Firm—Laff, Whitesel & Saret

(57) ABSTRACT

A removable, reusable safety light comprises a light strip and a protective jacket. The light strip comprises a plurality of microlights, such as LEDs, connected together in parallel by electrical lead wires and encased in a weather and shock resistant microlight protective housing. Control circuitry is provided for controlling operation of the light strip, and comprises control electronics and a printed circuit board. A power source, such as a battery, is included for powering the light strip. The battery is connected to the plurality of microlights via the control circuitry. The control electronics, printed circuit board and battery are housed in a control circuitry housing affixed to the microlight housing tube. The protective jacket is configured to hold the light strip, and can be configured for removably mounting the safety light on an object or the clothing of an individual.

26 Claims, 3 Drawing Sheets

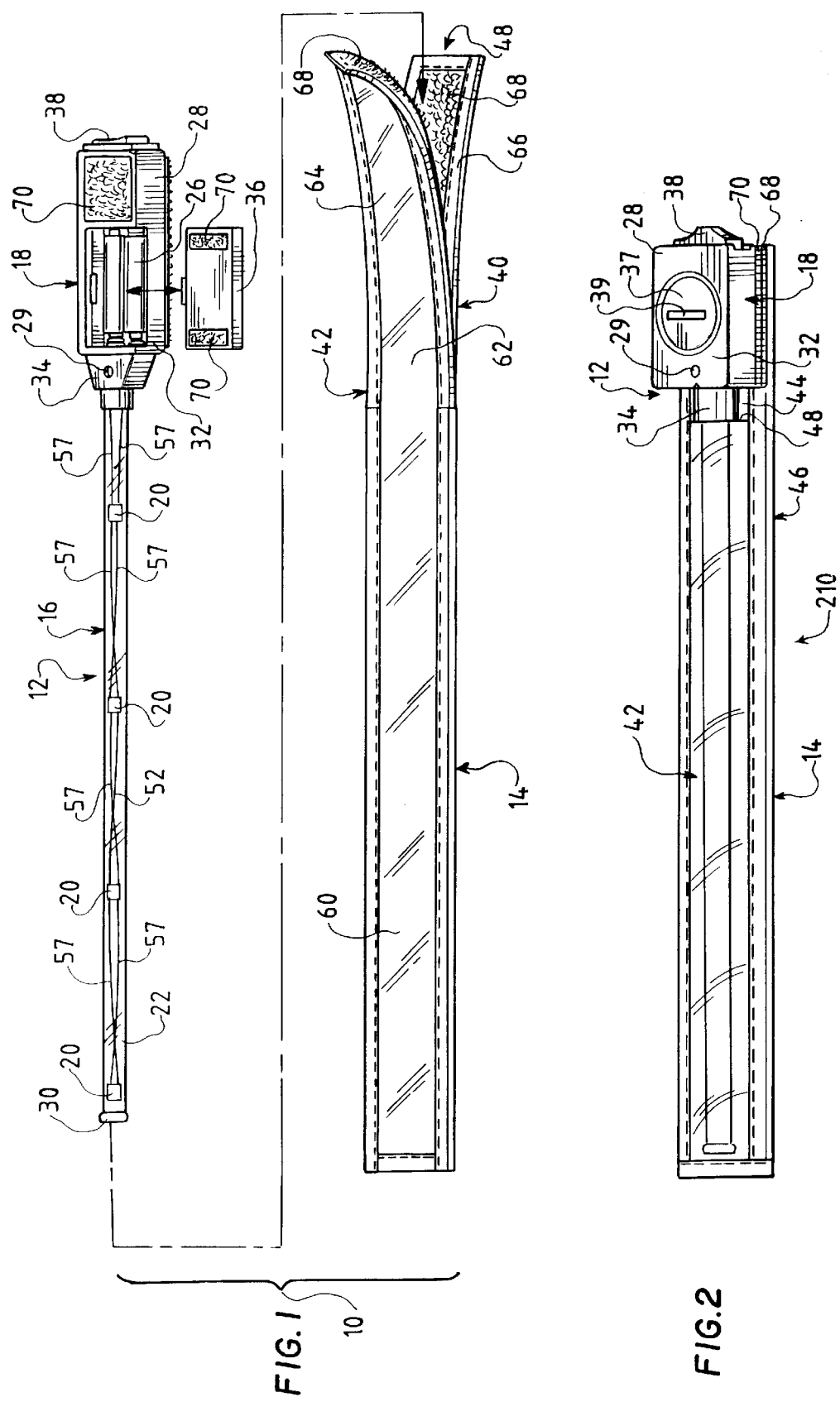

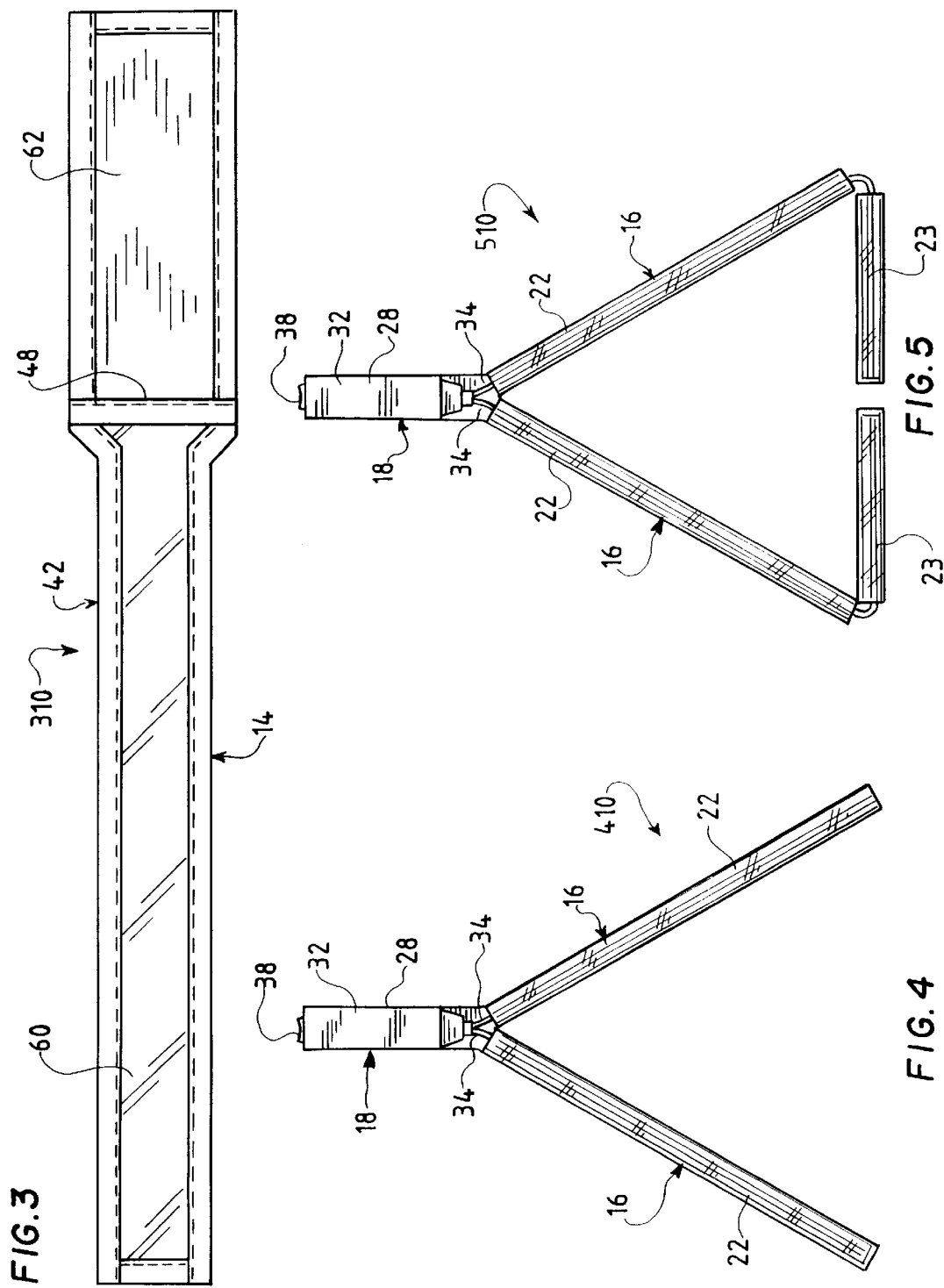

REMOVABLE, REUSABLE SAFETY LIGHT this application claim benefit to provisional application Ser. Nos. 60/077,742 Mar. 12, 1998, and 60/094,483 Jul. 28, 1998.

The present invention relates to illuminated safety devices. More particularly, the present invention relates to reusable safety lights that can be used as hand-held signaling devices or can easily be installed on and removed from objects and individuals for use in highlighting the object or individual in situations where visibility is critical.

BACKGROUND OF THE INVENTION

Among individuals who work in situations where visibility is critical such as traffic control officers, highway construction crews, railroad and airport personnel, and emergency personnel, it is a common practice to use visibility enhancement devices such as illuminated vests, belts and armbands. Additionally, visibility enhancement devices are often worn by joggers and bikers. These vests, belts and armbands are typically made of fluorescent colors such as orange, yellow, pink or lime green and can include reflective strips and/or luminescent technology devices.

The reflective strips and luminescent technology devices are generally sewn into the safety vests, belts and armbands. However, problems arise when the luminescent devices need to be serviced. When these devices are affixed by sewing or similar means, it is often very difficult to remove them for routine maintenance. Thus, the vests, belts and armbands must be replaced or repaired at only significant cost. Furthermore, conventional luminescent devices are expensive and easily damaged.

Accordingly, there is a need for a removable, reusable safety light that can be easily replaced and serviced without having to replace the entire vest, belt or armband.

It is also a common practice to use hand-held illuminated safety lights for directing traffic in and around hazards. Such hand-held safety lights typically comprise a conventional flashlight with a fluorescent-colored cone attached to the lighted end of the flashlight. The fluorescent cone is illuminated by an incandescent bulb mounted in the flashlight to form a hand-held signaling device.

One problem with the hand-held signaling devices of the prior art is that they are not protected from damage caused by environmental hazards and shock. Another problem with prior art signaling devices is that they are bulky and rigid, which makes them difficult to store in a pocket between uses.

Accordingly, there is a need for an improved hand-held safety light, and for a protective jacket to protect the safety light from damage.

SUMMARY OF THE INVENTION

These and other needs are satisfied by the removable, reusable safety light of the present invention. In accordance with the present invention, a safety light is disclosed that comprises an illuminatable light strip and a protective jacket for holding the light strip. The protective jacket can also be used for removably mounting the safety light to an object or the clothing of an individual.

The illuminatable light strip comprises a microlight section and a control circuitry section. The microlight section includes a plurality of microlights, such as light-emitting diodes or small incandescent bulbs, connected together in parallel by flexible electrical lead wires and encased in a weather and shock-resistant microlight protective housing.

The control circuitry section includes control circuitry and a power source housed in a weather-resistant plastic protective housing that is affixed to one end of the microlight protective housing. The control circuitry is configured for controlling the electrical operation of the light strip. Preferably, the control circuitry comprises control electronics mounted on a printed circuit board.

The light strip can be operated in a variety of different modes, as determined by the control circuitry. For example, the light strip can be continuously illuminated when turned on, or it can be configured to blink at various intervals or in various patterns. A switch connected to the control circuitry can control selection of the mode of operation.

The light strip is configured to fit within the protective jacket. The protective jacket comprises a base and cover operably connected together to form a sleeve with an opening for inserting and removing the light strip.

In one embodiment, the safety light can be configured for affixation to the clothing of an individual or to an object. In this embodiment, the base includes an inner reflective surface and an outer mounting surface. The inner reflective surface is configured to enhance the illumination of the microlights. The outer mounting surface is configured for removably securing the protective jacket and enclosed light strip to an object or an individual's clothing.

The cover comprises a translucent material having an opening for inserting and removing the light strip from the protective jacket. A flap covering may also be included for closing the cover opening for further water-proofing the protective jacket. The light strip can easily be removed from and replaced into the protective jacket.

In another embodiment, the safety light can be used as a hand-held signaling device. In this embodiment, the protective jacket comprises two strips of material operably connected together to form a jacket with an opening for inserting and removing the light strip. Each strip of material comprises a translucent section and a handle section. The strips of material are connected together such that the translucent sections match up with each other to form a translucent pocket and the handle sections match up with each other to form a handle.

Preferably, the handle comprises two flaps having fastening means for fastening the flaps around the control circuitry section. The flaps are sized longer than the control circuitry protective housing such that portions of the two flaps extend past the control circuitry protective housing. Between the two flaps is an opening into which the light strip can be inserted into the protective jacket.

Fastening means, such as hook and loop fasteners, are positioned on the inner surface of each flap with a hook fastener on one flap and a mating loop fastener on the other flap such that the hook and loop fasteners on the portions of the flaps that extend past the control circuitry protective housing mate with each other to hold the light strip in place. Hook and loop fasteners are also included on the control circuitry protective housing such that hook fasteners on the control circuitry protective housing mate with loop fasteners on the flaps or vice versa, further holding the light strip in place.

Alternatively, the protective jacket completely envelops the light strip. The opening is positioned at the translucent/handle section border on one side of the jacket. The inner surfaces of the handle section include fastening means, such as hook and loop fasteners, which are configured for securing the inner surfaces of the handle section together.

Preferably, each side of the control circuitry protective housing includes a fastening means, such as hook and loop fasteners, complementary to the inner surface fastening means of the handle section adjacent to that side of the control circuitry protective housing. In this manner, the fastening means on the inner surface of the handle section mates with the fastening means on the control circuitry protective housing, holding the light strip in place within the protective jacket. Furthermore, the fastening means on the inner surfaces of the handle sections mate with each other, closing up the opening in the jacket where the light strip is inserted.

BRIEF DESCRIPTION OF THE DRAWINGS

FIG. 1 is an exploded perspective view of a light strip and protective jacket according to the present invention;

FIG. 2 is a perspective view of another embodiment of a light strip and protective jacket according to the present invention;

FIG. 3 is a plan view of another embodiment of a protective jacket according to the present invention;

FIG. 4 is a plan view of a V-shaped safety light according to the present invention;

FIG. 5 is a plan view of a triangle-shaped safety light according to the present invention;

DETAILED DESCRIPTION OF THE PREFERRED EMBODIMENT

Figure 6:
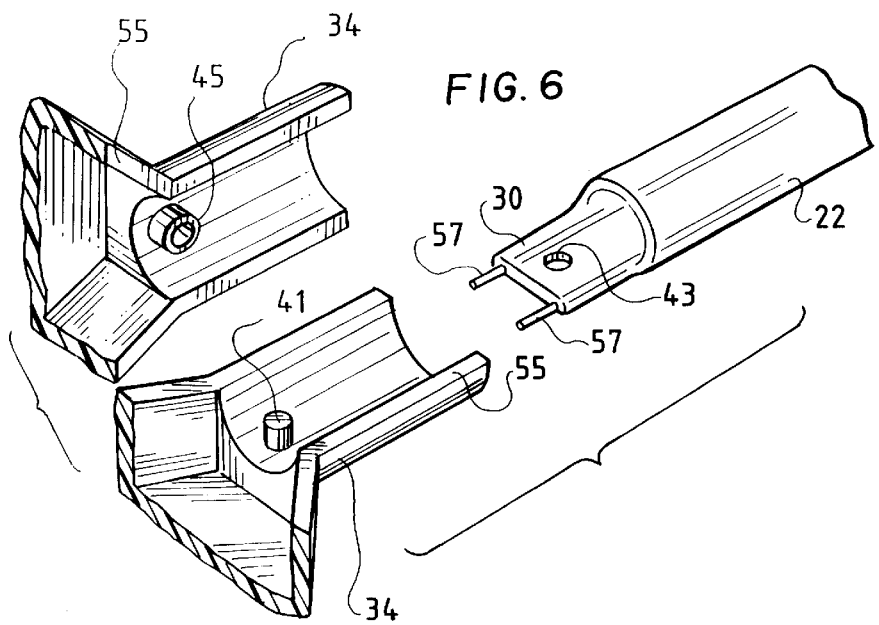
FIG. 6 is an enlarged cut-away perspective view of a connection means for connecting the microlight protective housing to the control circuitry protective housing of FIG. 1.

In accordance with the present invention, a removable, reusable safety light is described that provides distinct advantages when compared to those of the prior art. The invention can best be understood with reference to the accompanying drawing figures.

Referring now to FIG. 1, a safety light according to the present invention is generally designated by reference numeral 10. The safety light 10 of FIG. 1 is configured for use as a hand-held signaling device. The safety light 10 comprises a light strip 12 and a flexible protective jacket 14. The protective jacket 14 is configured for holding the light strip 12 and protecting the light strip 12 from damage due to shock or the weather.

The light strip 12 comprises a microlight section 16 and a control circuitry section 18. The microlight section 16 includes a plurality of microlights 20, such as light-emitting diodes or small incandescent bulbs, electrically connected together in parallel by flexible, electrical lead wires 57 (so that damage to one microlight 20 does not electrically disconnect others in the light strip 12) and encased in a weather- and shock-resistant tube-shaped microlight protective housing 22.

The microlight protective housing 22 is made of a flexible, translucent material, such as clear plastic, to allow light emitted from the microlights 20 to pass therethrough. In the preferred embodiment, the microlight protective housing 22 is made of PVC tubing. The ends 30 of the microlight protective housing 22 are crimped and heat-sealed to ensure that the microlight protective housing 22 is water-resistant. Additionally, the microlight protective housing 22 and electrical lead wires 57 are sufficiently flexible to be folded without breaking. In this manner, the safety light 10 can be folded and easily carried in a pants or jacket pocket when not is use.

The control circuitry section 18 includes control circuitry 24 (see FIG. 7) and a power source 26, such as batteries, housed in a weather-resistant protective housing 28. The housing 28 comprises a body portion 32 and a neck portion 34. In a preferred embodiment, the housing 28 comprises two separable housing halves fixed together by a fastener such as a screw 29. Preferably, the housing 28 is made of ABS plastic material.

The housing 28 includes a removable sliding battery door 36 that can be opened to replace the battery without separating the housing halves. Alternatively, the battery door can be a twist-turn type door 37 with a screw-driver slot 39. Preferably, the housing 28 is made of a hard molded material such as plastic.

As shown in FIG. 6, the neck portion 34 of the control circuitry protective housing 28 is connected to the microlight protective housing 22. One half neck portion 34 includes a pin 41 and the other half neck portion 34 includes a hollow post 45 configured for receiving the pin 41. One crimped, heat sealed end of the microlight protective housing 22 includes a complementary aperture 43. The pin 41 is inserted through the aperture 43 and into the hollow post 45 to secure the microlight protective housing 22 to the control circuitry protective housing 28. The neck portion 34 includes a narrow extension portion 55 sized to clamp onto the microlight protective housing 22 for further securing the microlight protective housing 22 to the control circuitry protective housing 28.

Figure 7:
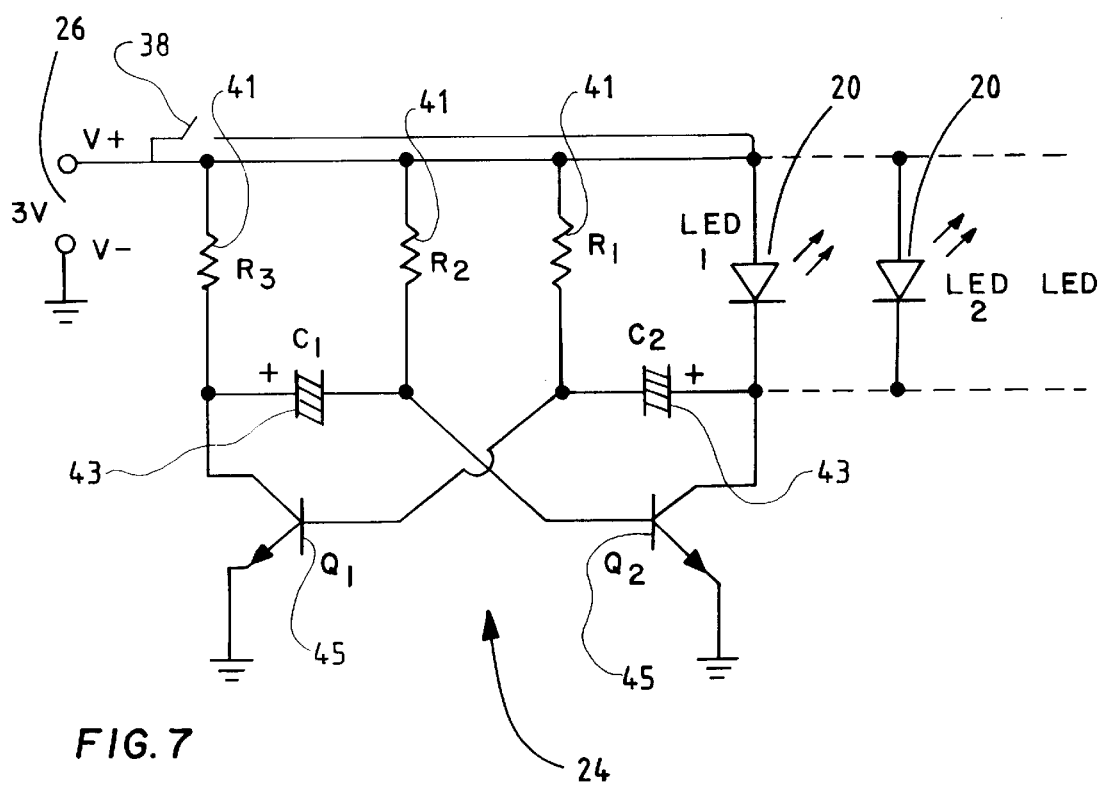
FIG. 7 is a schematic diagram of the control circuitry according to the present invention.

The control circuitry 24, shown schematically in FIG. 7, is configured for controlling the operation of the light strip 12. Preferably, the control circuitry 24 comprises control electronics mounted on a printed circuit board. The light strip 12 can be operated in a variety of different modes controlled by the control circuitry 24. For example, the light strip 12 can be configured to be continuously illuminated when turned on, or it can be configured to blink at various intervals or in various patterns.

The preferred control circuitry 24, shown in FIG. 7, comprises a conventional flip-flop circuit, which may be configured to "blink" the LEDs 20. As shown, the control circuitry 24 connects the power source 26 to the LEDs 20. The flip-flop circuit shown in FIG. 7 comprises three biasing resistors 41, two capacitors 43 and two transistors 45.

Generally, selection of the mode of operation is controlled by a switch 38 connected to the control circuitry 24. In the preferred embodiment, the switch 38 comprises a three-way switch with positions for shutting the light strip 12 off, continuously illuminating the light strip 12, and illuminating the light strip 12 in a periodic manner thus causing a blinking effect. The switch 38 is mounted on the control circuitry protective housing 28. In the embodiments shown in FIGS. 1, 4 and 5, the switch 38 is a rocker switch. In the embodiment shown in FIG. 2, the switch 38 is a slide switch. While certain specific switch types are shown in the figures, other suitable switch types can be used instead of the switch types mentioned above.

The power source 26 comprises a battery, which is electrically connected to the microlights 20 via the control circuitry 24 and electrical lead wires 57. In the preferred embodiment, the power source 26 comprises two conventional AAA 1.5-volt batteries. Alternatively, the power source 26 may comprise a 3-volt watch battery. Additional battery packs can be configured to be plugged into an extension port (not shown) in the control circuitry protective housing 28 to extend the life of the power source 26.

In the preferred embodiment, the overall length of the light strip 12 is approximately 12¾ inches and the width is approximately 1⅛ inches. The microlight protective housing 22 is approximately 8¼ inches long and ¾ inches wide. The control circuitry protective housing 28 is 4½ inches long and has a 3½-inch body and a 1-inch neck. However, various sizes and shapes of light strips 12 can be used. For example, 6-inch, 9-inch, 11-inch, 14-inch, 18-inch and 20-inch embodiments are contemplated.

The protective jacket 14 comprises a flexible base sheet 40 and a flexible cover sheet 42 operably secured together, such as by sewing, to form a flexible sleeve with an opening 48 for inserting and removing the light strip 12. Preferably, the protective jacket 14 is made of water-resistant material so as to protect the light strip 12 from moisture.

In the embodiment shown in FIG. 1, both the cover sheet 42 and base sheet 40 of the protective jacket 14 include a translucent section 60 and a handle section 62. The base sheet 40 and cover sheet 42 are sewn together such that the translucent sections 60 match up with each other to form a translucent pocket and the handle sections 62 match up with each other to form a handle.

The handle comprises two flaps 64, 66 having fastening means 68 for fastening the flaps 64, 66 around the control circuitry protective housing 28. The flaps 64, 66 are sized to be longer than the control circuitry protective housing 28 so that portions of the flaps 64, 66 extend past the control circuitry protective housing 28 and thus can be attached to each other. In this embodiment, the flaps 64, 66 form the opening 48 into which the light strip 12 is inserted.

Preferably, the fastening means 68 comprises hook and loop fasteners positioned on the inner surface of each flap 64, 66 with a hook fastener on one flap 64 and a loop fastener on the other flap 66 such that the hook and loop fasteners on the portions of the flaps 64, 66 that extend past the control circuitry protective housing 18 mate with each other holding the light strip 12 in place within the protective jacket 14. Fastening means 70, comprising hook and loop fasteners, are also provided on the exterior of the control circuitry protective housing 28 so that fasteners on the housing 28 mate with complementary fasteners on flaps 64 and 66 to further hold the light strip 12 in place. Preferably, the overall length of the protective jacket 14 is approximately 14¾ inches and the width is approximately 1½ inches. The handle is approximately 6¼ inches long and the translucent pocket is approximately 8½ inches long. However, various sizes and shapes of protective jackets 14 can be used to accommodate various size light strips 10.

An alternative embodiment of the safety light 310 is shown in FIG. 3. In this embodiment, the protective jacket 14 is configured to completely envelop the light strip 12. The opening 48 comprises a slit in the cover sheet 42 near the translucent/handle section boarder. Again, the inner surfaces of the handle section 62 of the cover sheet 42 and base sheet 40 include fastening means 68, such as hook and loop fasteners with complementary fastening means 70 on the control circuitry protective housing 28. In this manner, the fastening means 68 on the protective jacket 14 mates with the fastening means 70 on the control circuitry protective housing 28, holding the light strip 12 in place in the protective jacket 14. Additionally, the fastening means 68 on the cover sheet 42 mates with the fastening means 68 on the base sheet 40 to close the opening 48 in the protective jacket 14.

The embodiment of the safety light 210 shown in FIG. 2 is configured for attachment onto an object or the clothing of an individual for highlighting the object or individual in situations where visibility is critical. In this embodiment, the base sheet 40 includes an inner reflective surface 44 (which can be seen through the translucent cover 42 in FIG. 2) and an outer mounting surface 46. The inner reflective surface 44 serves to enhance the illumination of the microlights 20. Preferably, the inner reflective surface 44 is made of 3M™ brand or Reflexite™ brand reflective tape.

The outer mounting surface 46 of the base sheet 40 is designed for removably mounting the protective jacket 14 and enclosed light strip 12 onto an object or individual. In the preferred embodiment, the outer mounting surface 46 of the base sheet 40 comprises a hooked surface configured to mate with a looped surface on an object or the clothing of an individual, such as Velcro™ brand hook and loop fasteners. Alternatively, the outer mounting surface 46 may comprise a magnetic or adhesive material. In this manner the safety light 210 can be easily attached to and detached from an object or the clothing of an individual.

The safety light 210 can be attached to vests, belts, armbands, hard hats or other clothing articles for highlighting an individual. The safety light 210 can also be attached to cars, trucks or other vehicles or signs or other metal objects by using a magnetic mounting means on the outer mounting surface 46 of the protective jacket 14. Additionally, the safety light 210 can be attached to an elastic band, which can be used to removably attach the safety light 210 to objects of various sizes and shapes.

As previously noted, the cover sheet 42 comprises a translucent material having an opening 48 for inserting and removing the light strip 12 from the protective jacket 14. In this embodiment, the cover sheet 42 is shorter than the base sheet 40 leaving the control circuitry protective housing 18 exposed when held in the protective jacket 14. In an alternative embodiment, a flap (not shown) for covering the opening 48 is included on the base sheet 40. The flap is configured for folding over the opening 48, thus further water-proofing the protective jacket 14. A patch of hook or loop material may be placed on the cover 42 for mating with a complementary patch of hook or loop fastener material on the flap for holding the flap closed over the opening 48.

Fastening means 68, such as a hook and loop fastener, is included on the portion of the base sheet 40 that extends past the cover sheet 42. Complementary fastening means 70 is included on the side of the control circuitry protective housing 28 opposite the battery cover 37. These fastening means 68 and 70 mate to hold the light strip 12 in the protective jacket 14.

The overall length of the light strip 12 shown in FIG. 2 is approximately 10 ½ inches and the width is approximately 1⅛ inches. The microlight protective housing 22 is approximately 8¼ inches long and ¾ inches wide. The control circuitry housing 28 is 2¼ inches long and has a 1¾ inch body and a ½ inch neck. The overall length of the protective jacket 14 is approximately 11 inches and the width is approximately 1½ inches. The handle section is approximately 2½ inches long and the translucent pocket is 9½ inches long. However, various sizes and shapes of light strips 12 and protective jackets 14 can be made.

The safety light 10, 210, 310, 410 or 510, of the present invention has a minimum visibility of approximately ¼ mile. Approximate battery life is 72 hours in continuous mode and 105 hours in blinking mode.

As described, the safety light 210 can be easily attached to and removed from an object or individual. Additionally, the light strip 12 can be easily inserted into and removed from the protective jacket 14. This facilitates service and repair of the light strip 12.

Because the safety lights 210 are removable from safety vests, armbands and the like, washing the safety garments through conventional methods, such as using a washing machine, is facilitated without having to worry about damaging the safety lights 210. Additionally, the removability aspect is a safety feature in that if the safety light 210 gets caught in machinery or the like, the safety light 210 easily detaches from the vest or armband thus enabling the user to avoid serious injuries.

In an alternative embodiment shown in FIG. 4, two microlight protective housings 22 forming two microlight sections 16 can be connected to a single control circuitry section 18 to form a V-shaped safety light 210. In this embodiment, the control circuitry protective housing 28 includes two neck portions 34, which are preferably positioned at an angle of 60 degrees from each other. Each microlight section 16 is controlled by the control circuitry 24 in the same manner as the single microlight section 16 described above.

Two protective jackets 14 of the type shown in FIG. 2 can be used to hold the two microlight protective housings 22. In this manner, the V-shaped safety light 410 shown in FIG. 4 can be attached to objects such as a vehicle or sign for signaling hazardous conditions.

As shown in FIG. 5, an additional half-length microlight protective housing 23 can be attached to each of the two microlight protective housing 22 of the V-shaped safety light 410 of FIG. 4. Tubular protective jackets 14 similar to the one shown in FIG. 2, but having openings 48 on each end, can be placed on each of the two microlight protective housings 22 and additional tubular protective jacket 14 can be placed over the two half-length microlight protective housings 23 together to form a triangular safety light 510. The triangular safety light 510 can be attached to objects such as a vehicle or sign for signaling hazardous conditions.

From the foregoing, it will be apparent to those of ordinary skill in the art that modifications may be made without departing from the spirit and scope of the invention. Accordingly, it is not intended that the invention be limited except as may be necessary in view of the appended claims.

What is claimed is:

1. An illuminatible safety light comprising:
    a plurality of spaced microlights connected together by flexible electrical lead wires;
    a flexible, tubular, translucent microlight protective housing enclosing said plurality of microlights and said lead wires;
    control circuitry operably connected to said lead wires to illuminate said plurality of microlights;
    a power source operably connected to said control circuitry and said plurality of microlights for powering said plurality of microlights and said control circuitry;
    a control circuitry protective housing affixed to said microlight protective housing and enclosing said control circuitry and said power source; and
    a flexible protective jacket enclosing said translucent microlight protective housing and said control circuitry protective housing.

2. An illuminatible safety light comprising:
    a light strip comprising:
        a plurality of spaced microlights connected together by flexible electrical lead wires;
        a flexible tubular translucent microlight protective housing enclosing said plurality of microlights and said lead wires;
        control circuitry operably connected to said lead wires to illuminate said plurality of microlights;
        a power source operably connected to said control circuitry and said plurality of microlights for powering said plurality of microlights and said control circuitry; and
        a control circuitry protective housing affixed to said microlight protective housing and enclosing said control circuitry and said power source; and
    a flexible protective jacket for enclosing said light strip, wherein said protective jacket further comprises a translucent pocket for holding said microlight protective housing and a handle section for covering said control circuitry protective housing.

3. The safety light of claim 2 wherein said protective jacket comprises two strips of material operably connected together to form said protective jacket with an opening for inserting said light strip therein.

4. The safety light of claim 2 wherein said handle section comprises two flaps having fastening means for fastening said flaps around said control circuitry protective housing.

5. The safety light of claim 4 wherein said two flaps are longer than said control circuitry protective housing such that portions of said two flaps extend past said control circuitry protective housing when said light strip is held in said protective jacket and wherein said fastening means further comprises a hook and loop fastener wherein a first flap of said two flaps includes a first fastener on its inner surface and a second flap of said two flaps includes a second complementary fastener on its inner surface such that said first fastener on said portion of said first flap that extends past said control circuitry protective housing mates with said second complementary fastener on said portion of said second flap that extends past said control circuitry protective housing for securing said light strip in said protective jacket.

6. The light strip of claim 5 wherein a side of said control circuit protective housing adjacent said first flap includes a third fastener configured to mate with said first fastener on said first flap and a side of said control circuit protective housing adjacent said second flap includes a fourth fastener configured to mate with said second fastener on said second flap for securing said light strip in said protective jacket.

7. The safety light of claim 3 wherein said control circuitry protective housing comprises a body portion and a neck portion and wherein said neck portion is operably connected to one end of said microlight protective housing.

8. The safety light of claim 2 wherein said plurality of microlights comprise a plurality of light-emitting diodes.

9. The safety light of claim 2 wherein said power source comprises a battery and said control circuitry protective housing includes a removable battery door for replacing said battery.

10. The safety light of claim 2 wherein said plurality of microlights are connected together electrically in parallel.

11. The safety light of claim 2 wherein said control circuitry is configured to operate in at least two modes wherein in a first mode said plurality of microlights are continually illuminated and in a second mode said plurality of microlights are illuminated in an periodic manner.

12. The safety light of claim 2 wherein said microlight protective housing and electrical lead wires are sufficiently flexible to allow said microlight protective housing to be folded without breaking.

13. An illuminatible safety light comprising:
    a light strip comprising:
        a plurality of spaced microlights connected together by flexible electrical lead wires;

flexible, tubular, translucent microlight protective housing enclosing said plurality of microlights and said lead wires;

control circuitry operably connected to said lead wires to illuminate said plurality of microlights;

a power source operably connected to said control circuitry and said plurality of microlights for powering said plurality of microlights and said control circuitry; and a control circuitry protective housing affixed to said microlight protective housing and enclosing said control circuitry and said power source, wherein said control circuitry protective housing comprises a body portion and a neck portion and wherein said neck portion is operably connected to one end of said microlight protective housing and wherein said microlight protective housing includes an aperture near one end thereof and said neck portion includes a pin and hollow post wherein said pin in configured for insertion through said aperture into said hollow post for securing said microlight protective housing to said control circuitry protective housing.

14. A illuminatible safety light comprising:

a light strip comprising:
a plurality of spaced microlights connected together by electrical lead wires;
a translucent microlight protective housing enclosing said plurality of microlights;
control circuitry operably connected to said lead wires to illuminate said plurality of microlights;
a power source operably connected to said control circuitry and said plurality of microlights for powering said plurality of microlights and said control circuitry; and
a control circuitry protective housing affixed to said microlight protective housing and enclosing said control circuitry and said power source; and
a portable protective jacket for enclosing said light strip.

15. The safety light of claim 14 wherein said protective jacket further comprises:

a translucent pocket for holding said light strip; and fastening means for fastening said protective jacket and said light strip onto a surface.

16. The safety light of claim 15 wherein said protective jacket further comprises a base and a cover operably connected together to form said protective jacket with an opening for inserting said light strip therein wherein said cover is made of translucent material and said fastening means is operably connected to said base.

17. The safety light of claim 16 wherein said base includes a reflective inner surface adjacent to said translucent microlight protective housing for enhancing the illumination of said plurality of microlights.

18. The safety light of claim 14 further comprising two translucent microlight protective housings each enclosing a plurality of microlights and two protective jackets for holding said two microlight protective housings wherein said control circuitry protective housing comprises a body portion and two neck portions with each said neck portion being operably connected to one end of one of said two microlight protective housings to form a V-shaped safety light.

19. The safety light of claim 18 wherein said two microlight protective housings form an angle of approximately 60 degrees with respect to each other.

20. The safety light of claim 18 further comprising two half-length microlight protective housings each encasing at least one microlight, each of said two half-length microlight protective housings being connected to one of said two microlight protective housings at an end opposite said control circuitry protective housing, and each of said two half-length microlight protective housings enclosed by a protective jacket such that said two microlight protective housings and said two half-length microlight protective housings are configured to form a triangular safety light.

21. The safety light of claim 14 wherein said power source comprises a battery and said control circuitry protective housing includes a removable battery door for replacing said battery.

22. The safety light of claim 14 wherein said plurality of microlights are connected together electrically in parallel.

23. The safety light of claim 14 wherein said control circuitry is configured to operate in at least two odes wherein in a first mode said plurality of microlights are continuously illuminated and in a second mode said plurality of microlights are illuminated in an periodic manner.

24. The safety light of claim 14 wherein said microlight protective housing and said electrical lead wires are flexible allowing said microlight protective housing to be folded without breaking.

25. The safety light of claim 14 wherein said plurality of microlights comprise a plurality of light-emitting diodes.

26. An illuminatible safety light comprising:

a light strip comprising:
a plurality of spaced microlights connected together by electrical lead wires;
a translucent microlight protective housing enclosing said plurality of microlights;
control circuitry operably connected to said lead wires to illuminate said plurality of microlights;
a power source operably connected to said control circuitry and said plurality of microlights for powering said plurality of microlights and said control circuitry; and
a control circuit protective housing affixed to said microlight protective housing and enclosing said control circuitry and said power source; and
a protective jacket for enclosing said light strip, the protective jacket comprising a translucent pocket for holding said light strip; and fastening means for fastening said protective jacket and said light strip onto a surface, wherein said protective jacket further comprises a handle section such that said translucent pocket is sized to hold said microlight protective housing and said handle section is sized to accommodate said control circuitry protective housing, said handle section including fastening means for fastening said control circuitry protective housing to said handle section.

* * * * *